US012340661B2

(12) United States Patent
Pasley

(10) Patent No.: US 12,340,661 B2
(45) Date of Patent: Jun. 24, 2025

(54) GIFT BOX EVENT FOR LIVE STREAMER AND VIEWERS

(71) Applicant: 17LIVE Japan Inc., Tokyo (JP)

(72) Inventor: Christopher Pasley, Los Angeles, CA (US)

(73) Assignee: 17LIVE JAPAN INC., Tokyo (JP)

( * ) Notice: Subject to any disclaimer, the term of this patent is extended or adjusted under 35 U.S.C. 154(b) by 204 days.

(21) Appl. No.: 17/981,021

(22) Filed: Nov. 4, 2022

(65) Prior Publication Data

US 2024/0153350 A1 May 9, 2024

(51) Int. Cl.
*G07F 17/32* (2006.01)

(52) U.S. Cl.
CPC ................................ *G07F 17/3258* (2013.01)

(58) Field of Classification Search
CPC .................................................. G07F 17/3258
See application file for complete search history.

(56) References Cited

FOREIGN PATENT DOCUMENTS

JP 2021-020074 A 2/2021

OTHER PUBLICATIONS

Notice of Reasons for Refusal dated Sep. 22, 2023, issued in corresponding Japanese Patent Application No. 2023-105218 with English translation (4 pgs.).

Web page : https://17live-jp.zendesk.com/hc/ja/articles/4404217835279-%E3%82%AE%E3%83%95%E3%83%88, Gift-17LIVE help (zendesk.com) with English translation (5 pgs.).

Notice of Reasons for Refusal dated May 8, 2025, issued in corresponding Japanese Patent Application No. 2024-004375, with English translation (9 pgs.).

*Primary Examiner* — Reginald A Renwick
(74) *Attorney, Agent, or Firm* — Pillsbury Winthrop Shaw Pittman, LLP

(57) ABSTRACT

It is an objective of the disclosure to provide a method that a viewer can show their loyalty to a live streamer. By enhancing interactions among the streamer and their followers and subscribers, a sense of community between the streamer and his or her viewers is created. This can be accomplished by opening a gift box live streaming room where viewers can purchase bags containing gifts for the streamer. All the viewers work together to give randomly drawn gifts to the streamer. Once the streamer receives all the gifts, they will receive a prize and a prize value. By collaborating, the viewers feel a sense of accomplishment by helping the streamer. There is also an element of gamification by trying to get each gift drawn.

19 Claims, 11 Drawing Sheets

GIFT BOX EVENT FOR LIVE STREAMER AND VIEWERS

TECHNICAL FIELD

The present disclosure relates to a gift box event, or box gacha, that occurs during a live stream.

BACKGROUND

Owing to IT technological advancements, the way in which information exchange takes place is evolving. In the 20th century, one-way information communication occurred in the form of newspapers and later by television. Over the past thirty years or so, not only were cellular phones and computers popularized, but the communication speed of the Internet also increased greatly, resulting in the rise of real-time, two-way communication services, such as online chat service. Reduction in storage cost enables the popularization of video-on-demand (VOD) video broadcast service. Since 2019, video-based, real-time communication services, especially live streaming services, have been all the rage because of the robustness of smartphones and high network speed typical of 5G. Live streaming services entertain participants from around the world, and demand is only increasing. Streamers will broadcast themselves to the world while doing a variety of things, from simply chatting to playing music to teaching viewers a new skill. Interested viewers can tune in to watch the streamer. In response, viewers can express their appreciation to the streamer by sending them presents.

However, there is a disconnect between the streamer and their viewers. There is a lack of community between the content-creator and the content viewers. At most, the streamer puts out content that the viewers crave, but it is on an impersonal level. The line of communication travels only from the streamer to the viewers. The followers and subscribers can give presents to the streamer, but it is an isolated event. There is no way to express their appreciation to the streamer while working toward a larger goal.

SUMMARY

In view of the aforesaid drawback of the prior art, it is an objective of the disclosure to provide a method that a viewer can show their loyalty to the streamer. By enhancing interactions among the streamer and his or her viewers or his or her followers and subscribers, a sense of community between the streamer and his or her viewers is created. This can be accomplished by opening a gift box live streaming room where viewers can purchase bags containing gifts for the streamer. All the viewers work together to give randomly drawn gifts to the streamer. Once the streamer receives all the gifts, they will receive a prize and a prize value. By collaborating, the viewers feel a sense of accomplishment by helping the streamer. There is also an element of gamification by trying to get each gift drawn.

Further, another advantage of the disclosure is that the viewer is more incentivized than a normal present by receiving recognition for contributing to the streamer's cause. Additionally, the volume of currency transactions within the app increases.

According to an embodiment, a method of increasing interaction between a streamer and viewers, comprises: initiating a gift box event for the streamer and the viewers; displaying a plurality of gifts that can be drawn; displaying at least one bag that can be purchased, wherein the viewers can purchase a bag from the at least one bag that randomly draws a gift from the plurality of gifts for the streamer; when each gift of the plurality of gifts has been drawn, the streamer receives a prize; and incrementing a gift box level of the streamer.

In an embodiment, the streamer selects a gift box icon to open a gift box live streaming room.

In an embodiment, each gift is of one of a plurality of rarities.

In an embodiment, a first bag of the plurality of bags has a first cost, and a second bag of the plurality of bags has a second cost, wherein the second bag has gifts of increased rarity as compared to the first bag, and/or the second cost is higher than the first cost.

In an embodiment, purchasing a bag from the plurality of bags contains a random gift from the plurality of gifts based on the cost of the bag and the rarity of the gift.

In an embodiment, the random gift could be a duplicate that the streamer has already received.

In an embodiment, the method further comprises displaying a gift drawn number for each gift of the plurality of the gifts to show how many of each gift has already been drawn.

In an embodiment, the method further comprises displaying a time remaining in the gift box live streaming room to draw all the gifts of the plurality of gifts.

In an embodiment, subsequent to the incrementing a gift box level of the streamer, the method further comprises: displaying a second plurality of gifts that can be drawn; displaying at least one second bag that can be purchased, wherein the viewers can purchase a bag from the at least one second bag that randomly draws a gift from the second plurality of gifts for the streamer; when each gift of the second plurality of gifts has been drawn, the streamer receives a second prize; and incrementing another gift box level of the streamer.

According to an embodiment, a method of displaying a gift box live streaming room to a streamer and to viewers, comprises: displaying a gift box level of the streamer; illustrating a plurality of gifts having a plurality of rarities; illustrating a plurality of bags of different costs that can be purchased, wherein the viewers can purchase a bag from the plurality of bags that randomly draws a gift for the streamer based on the cost of the bag and the rarity of the gift; illustrating the prize for the streamer, wherein the streamer will receive the prize if all of the gifts in the box has been drawn for the streamer; and animating the prize and displaying a list of at least one of the viewers who purchased at least one of the bags for the streamer.

In an embodiment, the method further comprises displaying a gift box icon to the streamer that can be selected to open the gift box live streaming room.

In an embodiment, the plurality of gifts are displayed as different images or different pieces of a puzzle.

In an embodiment, the method further comprises displaying the rarity of each gift of the plurality of gifts, including common, rare, and very rare.

In an embodiment, the method further comprises displaying a gift drawn number for each gift of the plurality of the gifts to show how many of each gift has already been drawn.

In an embodiment, the method further comprises displaying a time remaining in the gift box live streaming room to draw all the gifts of the plurality of gifts.

In an embodiment, the method further comprises displaying the odds that each gift will be drawn when a bag of the plurality of bags is purchased.

In an embodiment, the method further comprises displaying a prize value to be received by the streamer for achieving the prize.

In an embodiment, the method further comprises recording a clip of the animating the prize and sending the clip to at least one of the viewers.

In an embodiment, the displaying a gift box level of the streamer includes displaying an incremented gift box level of the streamer after the streamer receives the prize.

According to an embodiment, a system for a gift box event, comprises: a streamer user terminal; a plurality of viewer user terminals; a server having a plurality of databases, including: a user database for storing data on streamers and viewers; a stream database for storing data on live streams; a bag database for storing data on bags; a prize requirement database for storing data on a completion criteria for each level; and a prize status database for storing data on a completion status of different gift box events; and a network that connects the streamer user terminal, the plurality of viewer user terminals, and the server.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further explain the principles of the invention and to enable a person skilled in the relevant art(s) to make and use the invention.

DETAILED DESCRIPTION

Figure 1:
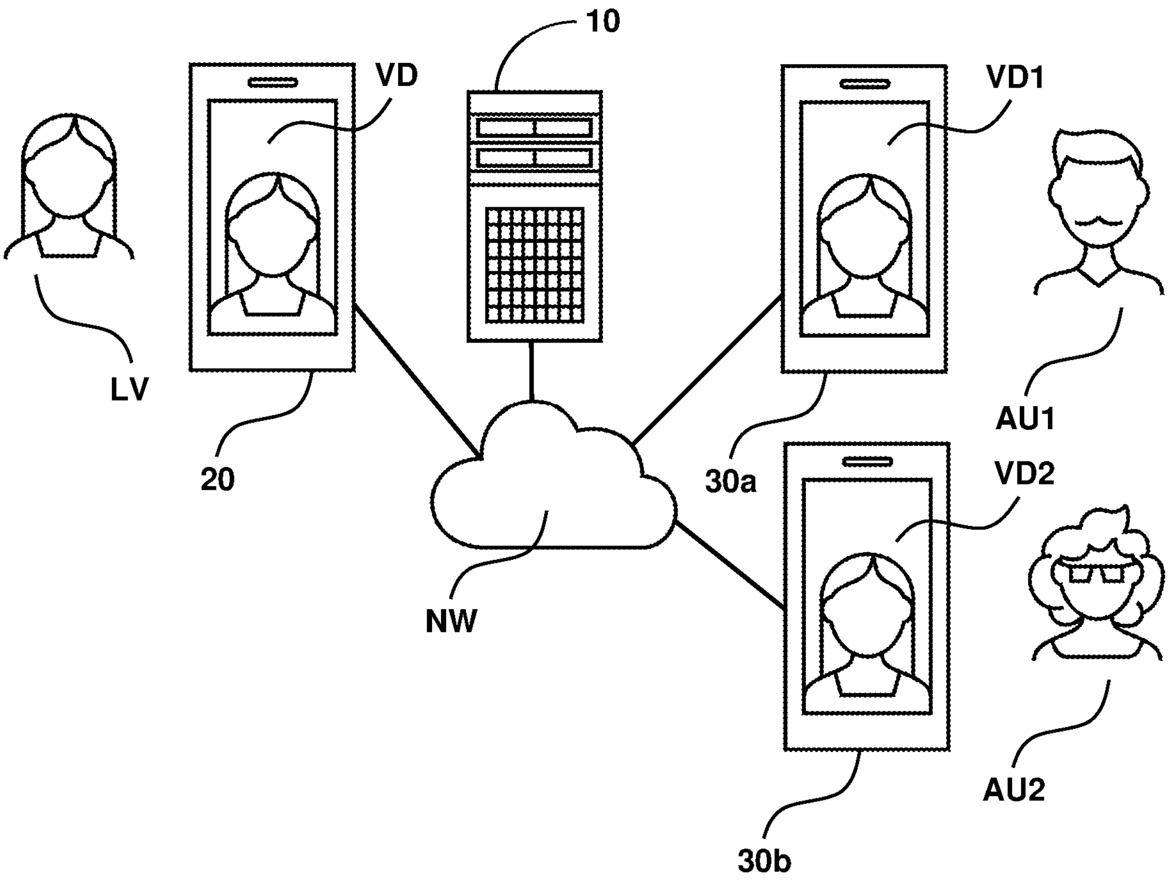
FIG. 1 is a schematic view of a live streaming system according to an embodiment of the disclosure.

Identical or equivalent constituent elements, components, processes, and signals shown in the drawings are denoted by identical reference numerals and reference signs, and related descriptions do not repeat. Some unimportant components disclosed hereunder are omitted from the drawings.

In an embodiment of this disclosure, the live streaming system provides a mechanism whereby a live streamer carries out a live stream smoothly and effectively, rendering live streaming fashionable and popular.

FIG. 1 is a schematic view of a live streaming system 1 according to an embodiment of the disclosure. The live streaming system 1 provides a two-way live stream service conducive to real-time communication between a live streamer (also known as streamer or liver) LV and viewers AU (including viewer AU1, viewer AU2, . . . ). As shown in FIG. 1, the live streaming system 1 comprises a server 10, a user terminal 20 at the live streamer end, and user terminals 30 (including user terminal 30*a*, user terminal 30*b*, . . . ) at the viewer end. The live streamer and the viewers are also collectively known as users. The server 10 comprises one or more information processing devices connected to a network NW. The user terminals 20, 30 are mobile terminals, such as smartphones, tablets, laptops, recorders, mobile game consoles, and wearable devices, or stationary devices, such as desktops. The server 10, user terminal 20 and user terminals 30 are connected by various networks NW, whether wired or wireless, and thus can communicate with each other.

Viewers AU can include followers, subscribers, or armies of the streamer LV. Followers and subscribers are those viewers who are interested in the streamer. A viewer can select a button to follow and subscribe to a particular streamer. On the other hand, armies of the streamer require a paid subscription that unlocks privileges and access to the streamer.

In the live streaming system 1, the live streamer LV, the viewers AU, and an administrator (not shown) which manages the server 10 are participants. The live streamer LV records audios and videos about his or her songs, comments, performance, fortune-telling, video game live streaming, or any other genre or topic with the user terminal 20 and then directly uploads the recorded audios and videos to the server 10, in real time. In this embodiment, the live streamer LV provides singing songs to the viewers AU by live streaming. The live streamer LV is or is not a musical artist. The administrator provides a platform disposed in the server 10 and adapted for use in a live stream and mediates or manages real-time communication between the live streamer LV and the viewers AU. At the user terminals 30, the viewers AU access the platform to select and watch expected content. During the live stream, the viewers AU express support, for example, by leaving messages, at the user terminals 30, whereas the live streamer LV, who provides the content, gives a response to the messages or related support, such that the response is transmitted to the viewers AU in the form of a video and/or audio to enable two-way communication.

The term "live streaming" used herein means a data transmission mode whereby "contents of audios and videos recorded at the user terminal 20 of the live streamer LV are played and viewed at the user terminals 30 of the viewers AU substantially in real time." The term "live stream" used herein means a broadcast implemented by the data transmission mode. The live stream is implemented by existing live stream technologies, such as HTTP Live Streaming, Common Media Application Format, Web Real-Time Communications, Real-Time Messaging Protocol, and MPEG DASH. In the data transmission mode of the live stream, the recording of contents by the live streamer LV and the viewing of the contents by the viewers AU with an established delay occur simultaneously. The delay is short enough to enable communication between the live streamer LV and the viewers AU. However, the live stream is different from a VOD broadcast. The VOD broadcast entails storing the entire data of the recorded contents in a server and then fetching the data from the server at a user's request at any point in time to provide the data to the user.

The "video data" disclosed herein includes image data (also known as video data) generated by the picture-taking function of the user terminals 20, 30 and audio data (also known as voice data) generated by the audio input function of the user terminals 20, 30. The video data is played at the user terminals 20, 30, and thus the users view its contents. In this embodiment, during the time period following the generation of the video data at the live streamer's user terminal but preceding the playing of the generated video data at the viewers' user terminals, the video data has its form, size and format changed by undergoing processes of compression, extension, encoding, decoding, transcoding, and translation. Despite the processes, the contents (for example, dynamic image or audio) of the video data remain unchanged substantially. Thus, in this embodiment, the video data which has undergone the processes is regarded as identical to the video data which has not yet undergone the processes for the sake of illustration. Thus, in the situation where the video data is generated at the live streamer's user terminal and then played at the viewers' user terminals via the server 10, the video data generated at the live streamer's user terminal, the video data played via the server 10, and the video data received and played at the viewers' user terminals are identical.

In the example illustrated by FIG. 1, the live streamer LV carries out a live stream. The image and audio of the live streamer LV carrying out the live stream are recorded at the user terminal 20 of the live streamer LV to generate video/audio data, and then the video/audio data is sent to the server 10 via a network NW. The user terminal 20 presents the recorded dynamic image VD of the live streamer LV on the screen of the user terminal 20, so as to confirm the contents broadcast by the live streamer LV.

The user terminals 30*a*, 30*b* of the viewers AU1, AU2 who access the platform to request viewing the live stream of the live streamer LV receive the video/audio data of the live stream via a network NW to play the received video/audio data, display dynamic images VD1, VD2, respectively, on the screens, and output audio from the loudspeaker. The dynamic images VD1, VD2 displayed on the user terminals 30*a*, 30*b* are substantially identical to the dynamic image VD whose picture is taken by the user terminal 20 of the live streamer LV. The audio outputted by the user terminals 30*a*, 30*b* are substantially identical to the audio recorded by the user terminal 20 of the live streamer LV.

The audio-recording and video-shooting at the user terminal 20 of the live streamer LV and the playing of video/audio data at the user terminals 30*a*, 30*b* of the viewers AU1, AU2 occurs substantially simultaneously. If the viewer AU1 leaves a message at the user terminal 30*a* in response to the contents of the live streamer LV, the server 10 will display the message at the user terminal 20 of the live streamer LV and the user terminals 30*a*, 30*b* of the viewers AU1, AU2 in real time. After reading the message, the live streamer LV begins to comment on its contents. The dynamic images and audios of the comments are outputted from the user terminals 30*a*, 30*b* of the viewers AU1, AU2, signaling the commencement of a dialogue between the live streamer LV and the viewer AU1. Therefore, live streams carried out with the live streaming system 1 achieve two-way communication.

The user terminals 30 have the same function and structure as the user terminal 20. The live streamer LV and viewers AU download a live stream application (hereinafter referred to as the live stream app) of this embodiment to the user terminals 20, 30 from an application market via the network NW and install it. Alternatively, the live stream app is installed on the user terminals 20, 30 in advance. The user terminals 20, 30 execute the live stream app and thereby communicate with the server 10 via the network NW to perform various functions. The description is hereinafter based on regarding the functions implemented by the execution of the live stream app by the processors of the user terminals 20, 30 as the functions of the user terminals 20, 30. The functions are performed on the user terminals 20, 30 by the live stream app. In another embodiment, the functions are implemented with a computer program written in a programming language, such as HTML (Hyper Text Markup Language), sent from the server 10 to a browser of the user terminals 20, 30 via the network NW, and executed by the browser.

Figure 2:
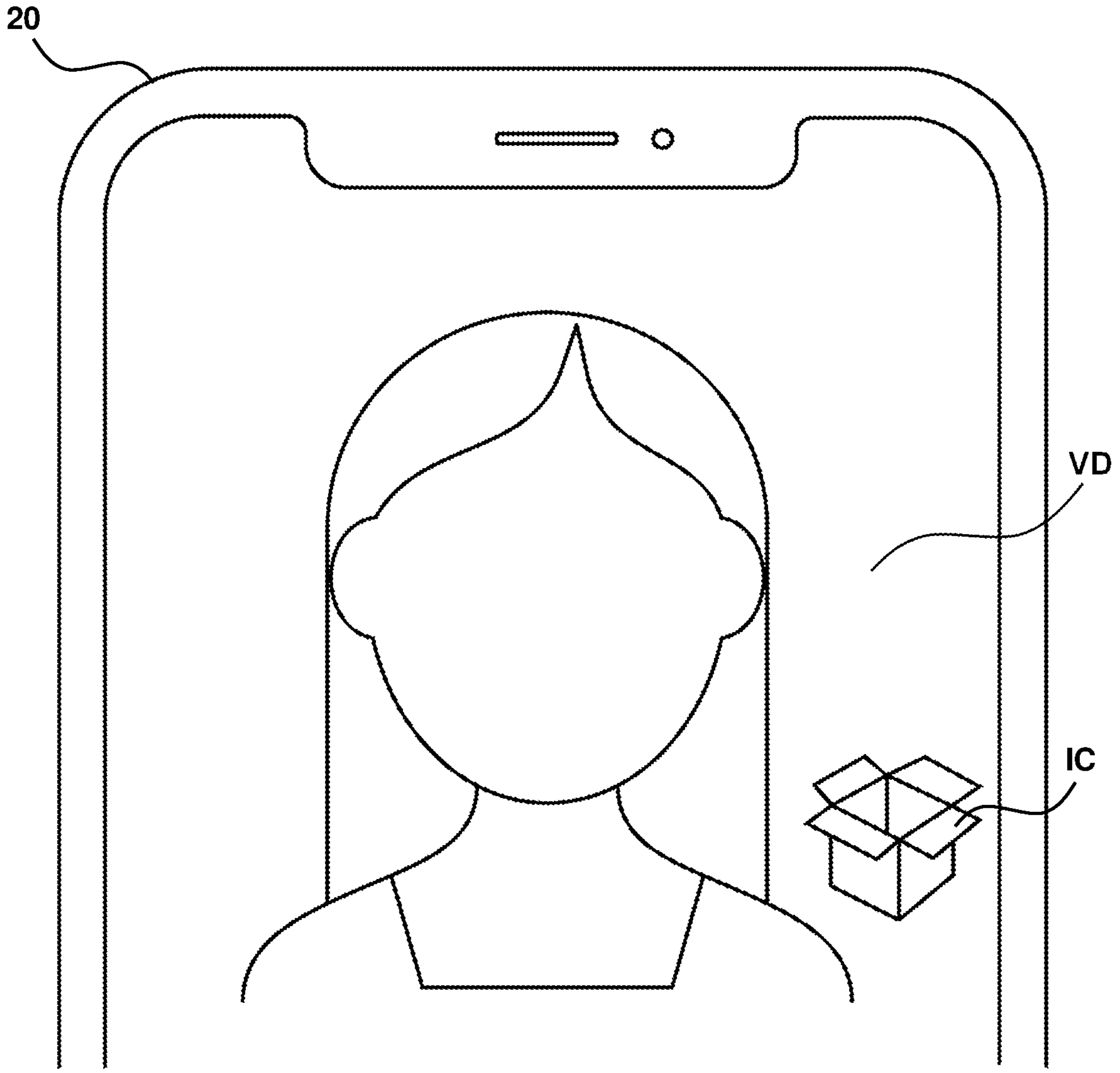
FIG. 2 is a schematic view of a streamer user terminal according to an embodiment of the disclosure.

FIG. 2 is a schematic view of a streamer user terminal 20 according to an embodiment of the disclosure. The streamer user terminal 20 displays the dynamic image VD of the streamer LV during a live stream. In the corner of the streamer user terminal 20, a gift box icon IC is displayed. This signals to the streamer LV that a gift box event is ready to start. When the streamer LV is ready, such as when the live stream is finished or suspended or in the middle of the live stream, they can select the gift box icon IC. Consequently, the streamer LV and viewers AU1, AU2, . . . will be led to a gift box live streaming room GSR such as that shown in FIG. 3. It is noted that the gift box icon IC only appears on the streamer user terminal 20 and not on any of the viewer user terminals 30*a*, 30*b*. As a result, only the streamer LV can see and select the gift box icon IC. The viewers AU1, AU2 cannot initiate the gift box event. Alternatively, in another embodiment, it may be configured so that the viewers can initiate the gift box event for the streamer. This may or may not be accompanied by payment of corresponding points by the viewer who initiates the gift box event.

Selecting the gift box icon IC or any other button can be accomplished in one of many ways. On a touchscreen device such as a smartphone or tablet, selecting can be done by tapping the button with a finger or a stylus. On a non-touchscreen device with peripherals such as a laptop or desktop, selection can be made by clicking on the button with a mouse or pressing a keyboard button.

The gift box icon IC that can be selected is shown to be just a gift box in FIG. 2. However, the gift box icon IC is not limited to just that. For example, the icon IC can be an image of confetti and a party hat or a wrapped present. Further, the gift box icon IC can be accompanied with text, such as "Gift Box Event!" or "Box Gacha!" As the gift box event is time-sensitive, the gift box icon IC can also be accompanied by the time remaining to participate in the gift box event. For example, below the icon IC can be the text "1 day left!" or "3 hours left!" That means the streamer LV has 1 day or 3 hours left to select the icon IC to start the gift box event before it expires.

Alternatively, or in addition to the gift box icon IC appearing in the streamer user terminal 20 shown in FIG. 2, the icon IC can also appear on a stream setting page (not shown) of the streamer. It can appear as an official event for the streamer on the stream setting page; when selected, the gift box live streaming room GSR of FIG. 3 will open.

Figure 3:
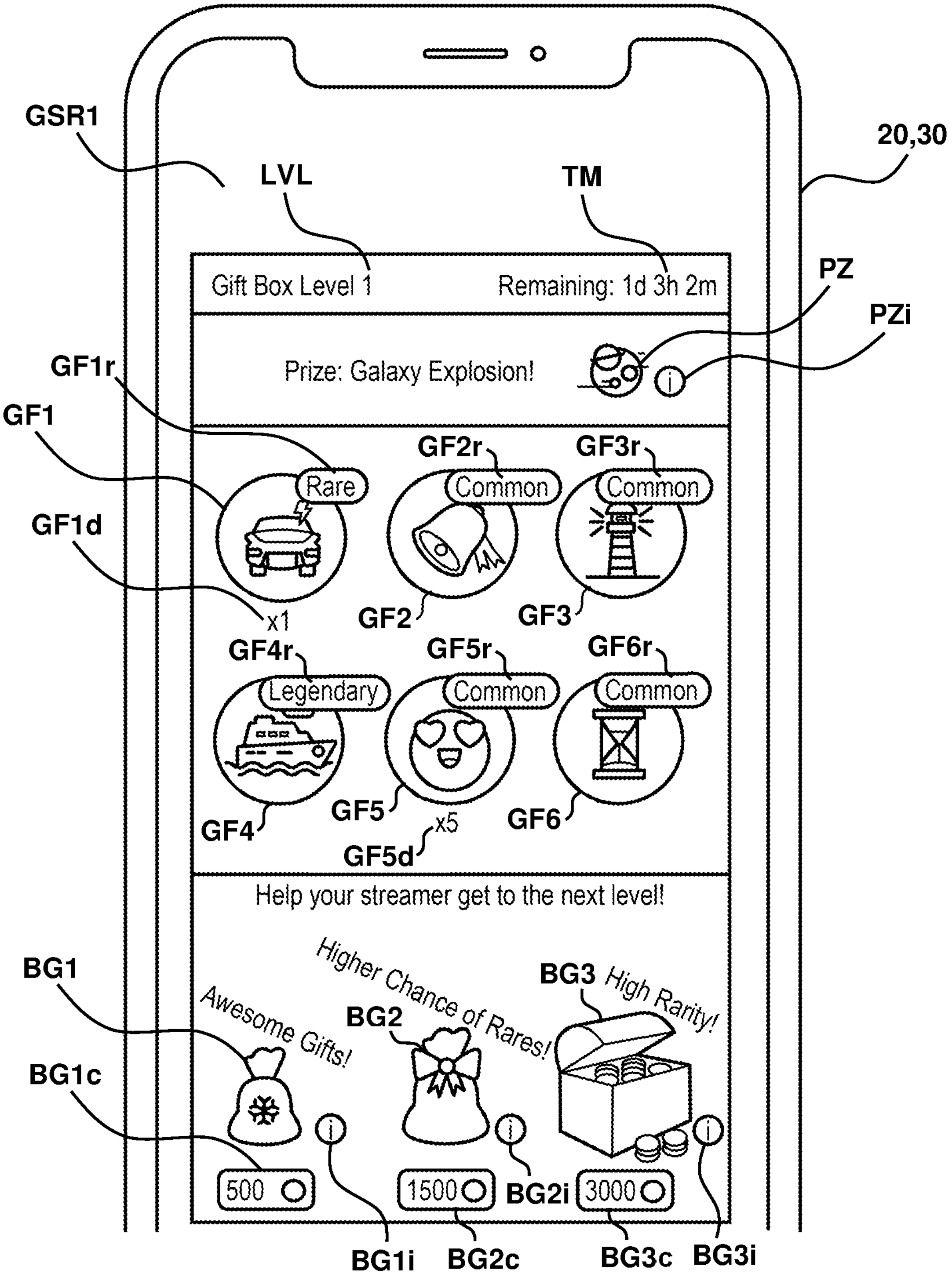
FIG. 3 is a schematic view of a level 1 gift box live streaming room according to an embodiment of the disclosure.

FIG. 3 is a schematic view of a level 1 gift box live streaming room GSR1 according to an embodiment of the disclosure. The live streaming room GSR1 is displayed on both the streamer and viewer user terminals 20, 30. The level 1 gift box live streaming room GSR1 displays a gift box level LVL (in this case, 1) and a time remaining TM (in this case, 1 d 3 h 2 m). While the level LVL and time TM are shown at the top of the user terminals 20, 30, they can be positioned anywhere on the user terminals 20, 30.

Next, a prize PZ for completing the current level is shown. In this case, the prize is a galaxy explosion but is not limited to this. The text reads "Galaxy Explosion!" and an image of the same is displayed. A prize information PZi icon can be selected to see more about the prize PZ. Selecting the prize information PZi will take the user to the screen shown in FIG. 5, which will be described later.

Below the prize PZ is shown a plurality of gifts GF1-GF6. Each of these gifts must be drawn to complete the level. In order words, the streamer LV must receive at least one of each gift GF1-GF6 to receive the prize PZ and move to the next level.

Now the plurality of gifts GF1-GF6 will be described. Gift 1 GF1 is represented by an image inside the circle having a gift 1 rarity GF1r and having a gift 1 drawn number GF1d. In this example, the gift 1 GF1 is shown be a sports car having a rarity GF1r of rare. A gift 1 drawn number GF1d is indicated as "xl," meaning one sports car has already been drawn for the streamer LV. Gift 2 GF2 is shown to be a bell having a rarity GF2r of common. There is no number under gift 2 GF2, signifying that no bells have been drawn yet for the streamer LV. Gift 3 GF3 is a lighthouse with rarity GF3r of common that has yet to be drawn. Gift 4 GF4 is a cruise with rarity GF4r of legendary that has yet to be drawn. Gift 5 GF5 is a heart eyes with rarity GFSr of common with a gift 5 drawn number GFSd of "x5," signifying that it has already been drawn five times for the streamer LV. Gift 6 GF6 is an hourglass of common rarity GF6r that has yet to be drawn.

With the requirement that each gift must be drawn for the streamer LV to advance, the streamer LV, in this example, still needs one each of gift 2 GF2 (bell), gift 3 GF3 (lighthouse), gift 4 GF4 (cruise), and gift 6 GF6 (hourglass). When a gift is drawn, it can be grayed out in the live streaming room GSR1 to show that the gift requirement has been satisfied. Alternatively, gifts not yet acquired can be grayed out to show that the streamer LV still lacks these particular gifts. In this example, 5 gifts of heart eyes (gift 5 GF5) have already been acquired. While only one is necessary, it is possible to have multiple of one gift due to the random nature of drawing gifts. The streamer LV can be rewarded with a bonus for having a certain number of duplicates. For example, if the streamer LV has 10 common duplicates when completing a level, they will receive an additional one thousand coins.

Next, the bags that can be purchased by the viewers AU for the streamer LV at the bottom of FIG. 3 will be described. Bag 1 BG1 has a bag 1 cost BG1c, and bag 1 information BG1i can be selected to see more information. In this example, bag 1 BG1 has a bag 1 cost BG1c of 500 coins. Bag 2 BG2 has a bag 2 cost BG2c of 1500 coins, and more information can be found at bag 2 information BG2i. Bag 3 BG3 has a bag 2 cost BG3c of 3000 coins, and bag 3 information BG3i can be selected, which will direct the user to the screen shown in FIG. 4. There are variable tiers of bags based on cost, which change the likelihood of drawing a rare or very rare, or legendary, gift. As the bag price increases, there is a higher likelihood of drawing a rare or very rare gift. Consequently, the more expensive bags entice the viewers AU with better loot.

The coins used to purchase the bags are an in-app currency. In FIG. 3 and other figures, the currency symbol is denoted by o. Coins can be purchased using real-world money or exchanged for using loyalty points, which will be described later below.

When viewers AU purchase a bag BG1-BG3 for the streamer LV, a random draw is then performed to determine the gift that the streamer LV will receive. The tier of the bag will determine the odds for receiving a common, a rare, or a very rare gift.

For example, for bag 1 BG1, there is a 24% chance of drawing each common gift, which includes the bell (gift 2 GF2), the lighthouse (gift 3 GF3), the heart eyes (gift 5 GF5), and the hourglass (gift 6 GF6). Each common gift has the same probability of being drawn. As a result, with a total of four common gifts, there is a 96% chance that a common will be drawn. Moreover, bag 1 BG1 gives a 3% chance of drawing a rare gift, which would be the sports car of gift 1 GF1. Further, there is a 1% chance of drawing a very rare, or legendary, gift, that being the cruise of gift 4 GF4 in this example. These percentages are provided as a reference, and the embodiment is not limited to these probabilities. For bag 2 BG2, the probability of receiving a common gift decreases with respect to bag 1 BG1, while the probabilities of drawing a rare or a very rare increases. For bag 3 BG3, the probabilities decrease or increase further, respectively. As a result, there is the highest chance of drawing a legendary when purchasing bag 3 BG3. In this embodiment, there are three purchasable bags; however, the present disclosure is not limited to this. For example, in an embodiment, there is only one bag available for purchase. In another embodiment, there are ten bags with different prices available for purchase.

Figure 4:
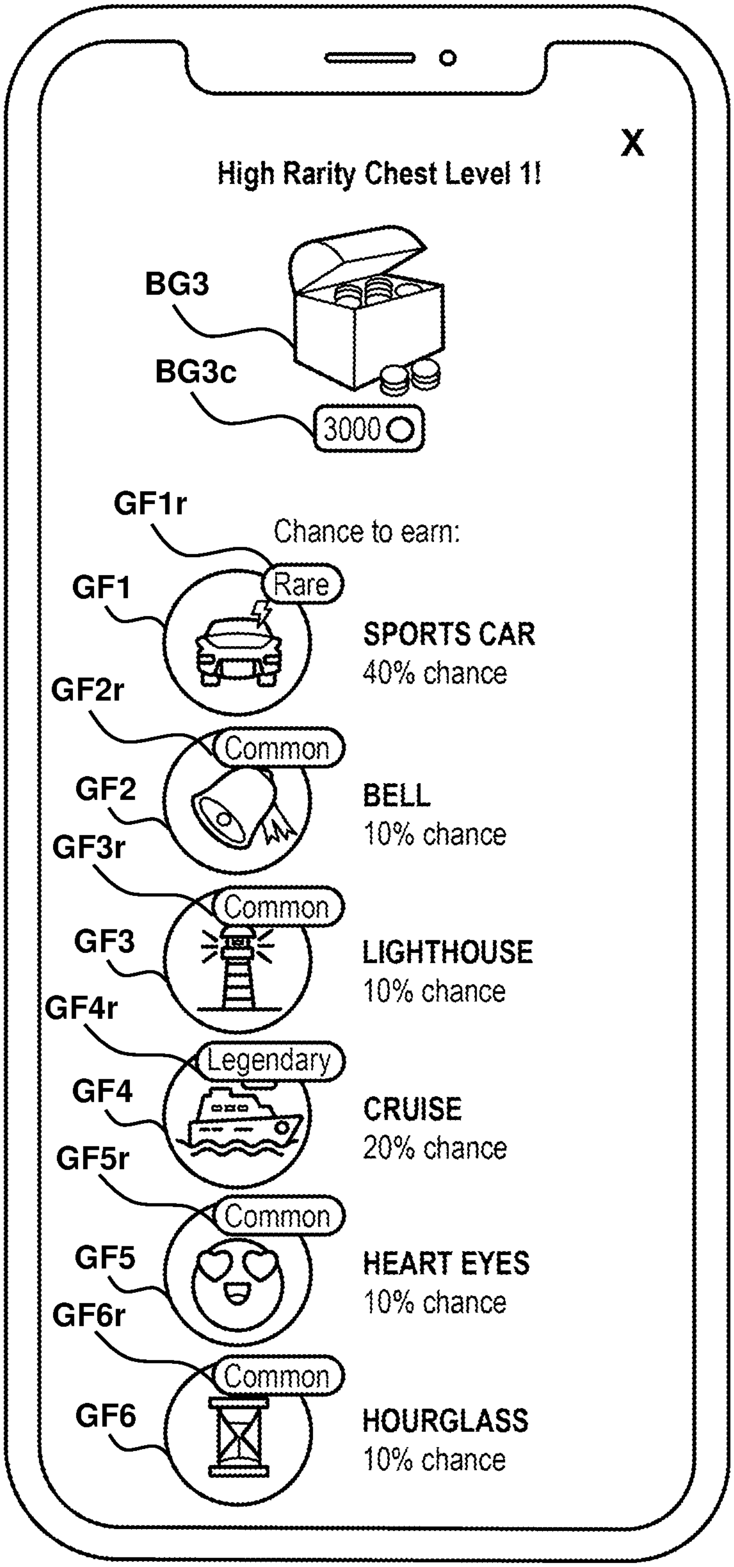
FIG. 4 is a schematic view of a bag information screen according to an embodiment of the disclosure.

FIG. 4 is a schematic view of a bag information screen according to an embodiment of the disclosure. The bag information screen provides more information about bag 3 BG3 and is shown after the user selects the bag 3 information BG3i icon in FIG. 3. Information about percentages of drawing each gift GF1-GF6 is provided. For bag 3 BG3, there is a 10% chance of drawing any of the four common gifts (which results in an 40% chance of drawing a common), a 40% chance of drawing a rare, and a 20% chance of drawing a very rare, or legendary. Compare these percentages to that of bag 1 BG1, and bag3 BG3 provide higher probabilities for drawing a rare or legendary gift. The bag information screen is required by some app stores to make the random draw odds clear to the viewers.

Figure 5:
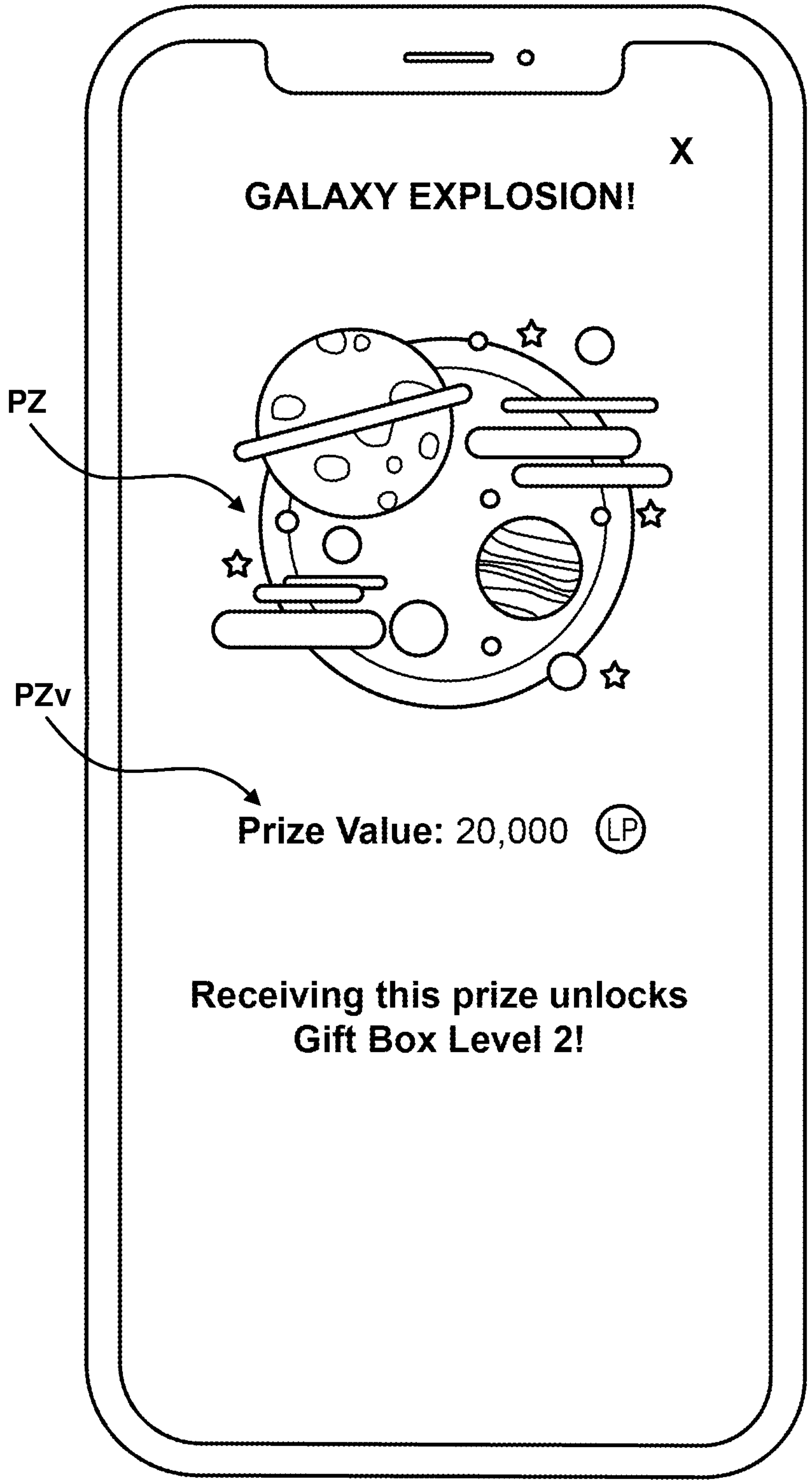
FIG. 5 is a schematic view of a prize information screen according to an embodiment of the disclosure.

FIG. 5 is a schematic view of a prize information screen according to an embodiment of the disclosure. The prize information screen provides more information about the prize and is shown after the user selects the prize information PZi icon in FIG. 3. The prize information screen displays a larger image of the prize PZ. Additionally, the prize information screen displays a prize value PZv. The prize value PZv is the number of loyalty points the streamer LV will receive for completing the current level. In this example, the streamer LV will receive 20,000 LP (or loyalty points) for completing level 1. More details about loyalty points will be provided below. In general, the prize value PZv amount will be greater in value than the number of coins the viewers AU will spend to accrue all the gifts in the gift box for the streamer LV. As a result, this incentivizes the viewers AU to work together to obtain the prize PZ for the streamer LV.

Figure 6:
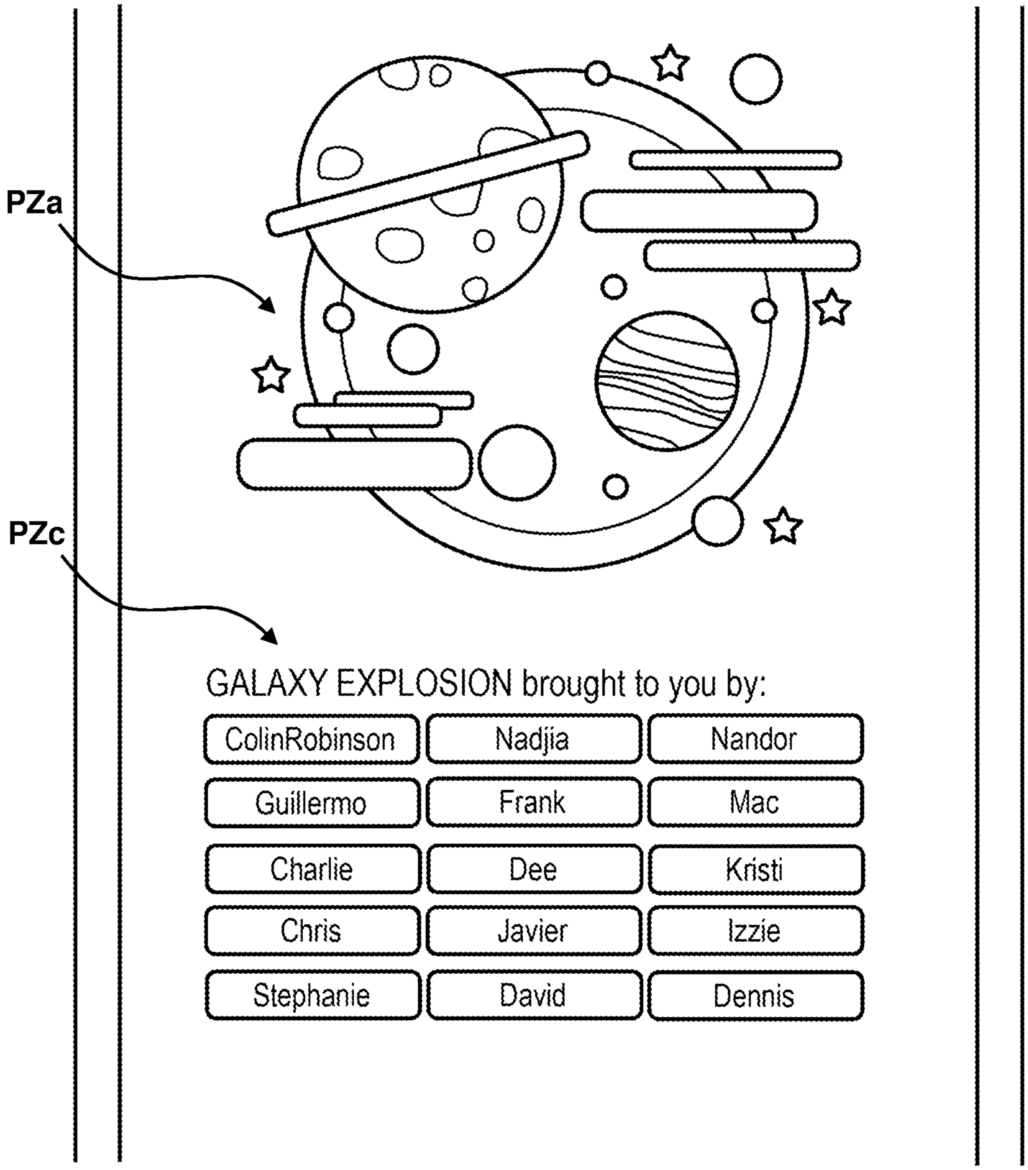
FIG. 6 is a schematic view of a prize animation screen according to an embodiment of the disclosure.

FIG. 6 is a schematic view of a prize animation screen according to an embodiment of the disclosure. The prize animation screen only appears when the streamer LV has completed the level. Completing the level requires the viewers AU to purchase enough bags BG1-BG3 to randomly draw each of the gifts GF1-GF6. The prize animation screen will show a prize animation or effect PZa, which can be a video or series of images that animate the prize. For example, planets can appear and blow up for the galaxy explosion prize animation.

Additionally, the streamer will receive the prize value PZv of 20,000 loyalty points, as shown in FIG. 5. It is also possible that the viewers will receive a reward for their efforts, such as 5% of the coins that they spent to purchase bags. For example, a viewer who purchased bag 3 BG3 with a cost BG3c of 3000 coins would receive 5% of their coins back, or 150 coins, after completing the level. Providing rewards to the viewers will further motivate the viewers to give and finish the level.

Further, the prize animation screen can include a list of prize contributors PZc to show all the viewers AU who purchased bags for the streamer LV. It is possible to list the prize contributors PZc in order of contribution amount with the highest contributor listed first. In this case, viewer "ColinRobinson" spent the most coins purchasing bags on this level. Alternatively, the prize contributors PZc can be listed in chronological or alphabetical order. Additionally, it is not necessary to list all contributors, especially when there are a large number of contributors. In that case, only the prize contributors PZc who drew a rare or legendary gift can be listed. Alternatively, the list of prize contributors PZc can be filtered by listing only those viewers AU who purchased the most expensive bag BG3. Another alternative could be listing only the prize contributors PZc who spent above a threshold number of coins. A further variation could be that contributors are listed one time for each bag purchase they make; as a result, some contributors could be listed multiple times for making multiple bag purchases. However, the order and the way in which the prize contributors PZc are listed are not limited to these. As a result, the streamer LV is made aware of the contributors who helped complete the level.

When the prize animation screen of FIG. 6 is triggered, the content will automatically be recorded in a video clip. The video clip will capture the entirety of the prize animation or effect PZa as well as the list of prize contributors PZc. The video clip will then be sent out to everyone on the list of prize contributors PZc. Alternatively, the video clip can be sent out to all the viewers AU who entered the gift box live streaming room at some point. Further, an alternative or in addition to recording a video clip would be capturing and sending out a screenshot of the prize animation screen. As a result, this will make the app more social or engaging. In another embodiment, the prize animation PZa overlies or is superimposed on the dynamic image VD (see FIG. 2) of the streamer, so that the viewer can see the prize animation PZa and the streamer at the same time in the live stream.

After the prize animation PZa in FIG. 6 is completed, the prize animation screen will end, and the gift box live streaming room for the next level is shown. In this example, FIG. 7 showing a level 2 room will be displayed next.

Figure 7:
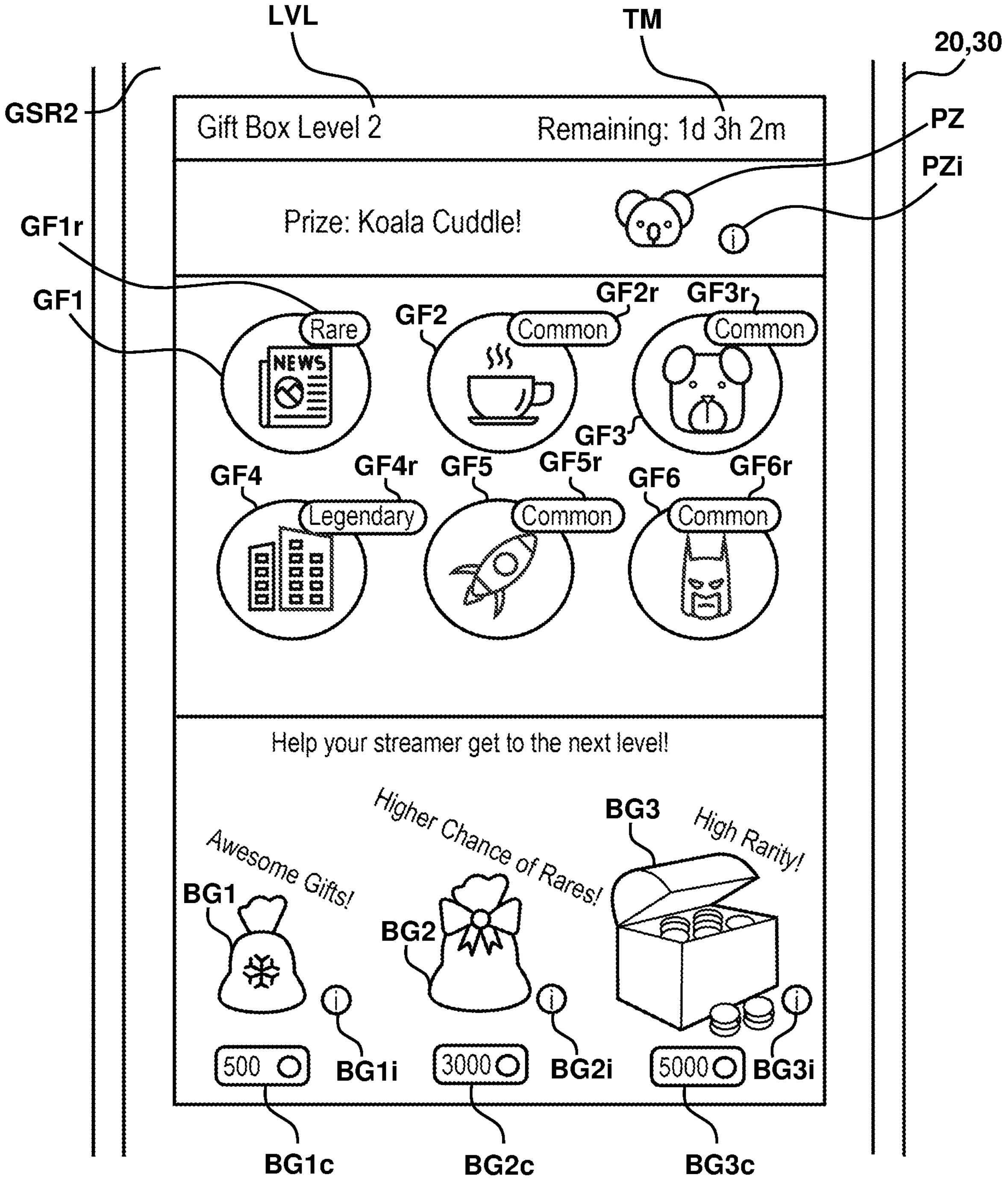
FIG. 7 is a schematic view of a level 2 gift box live streaming room according to an embodiment of the disclosure.

FIG. 7 is a schematic view of a level 2 gift box live streaming room GSR2 according to an embodiment of the disclosure. The level 2 gift box live streaming room GSR2 has a configuration similar to that of level 1 gift box live streaming room GSR1. Differences of the level 2 gift box live streaming room GSR2 include that the gift box level LVL number has now been incremented to 2. The prize PZ for level 2 is koala cuddle, and each of the gifts GF1-GF6 has been changed for level 2. At the beginning of a level, no gifts have yet been drawn for the streamer LV; as a result, there are no gift drawn numbers GF1d-GF6d shown. Last, the bag costs BG2c and BG3c have increased.

The gifts GF1-GF6 of level 2 gift box live streaming room GSR2 shown in FIG. 7 will next be described. Among the six gifts, gift 1 GF1 is a newspaper having a rarity GF1r of rare, gift 2 GF2 is a coffee having a rarity GF2r of common, gift 3 GF3 is a dog having a rarity of GF3r of common, gift 4 GF4 is a building having a rarity GF4r of legendary, gift 5 GF5 is a rocket having a rarity GF5r of common, and gift 6 GF6 is a superhero having a rarity GF6r of common.

In this example, the rarities in each of level 1 and level 2 live streaming rooms GSR1 and GSR2 are positioned at the same locations. For example, gift 1 rarities GF1r are rare, gift 4 rarities GF4r are legendary, and gifts 2, 3, 5, and 6 rarities GF2r, GF3r, GF5r, and GF6r, respectively, are common. However, this invention is not limited to that. The different rarities can be positioned randomly. Further, both level rooms GSR1 and GSR2 have four common gifts, one rare gift, and one legendary gift. Again, this invention is not limited to this. There could be more or less of each rarity as desired. It is possible to make the levels increasingly challenging by having more rares and for the highest levels, having multiple legendaries. For example, level 20 could have one common, two rares, and three legendaries. Alternatively, or additionally, it is not required for each level LVL to have a set quantity of six gifts GF1-GF6. There could be more or less gifts as desired. Since the levels increase in difficulty, there could be, for example, four gifts on level 1 and ten gifts on level 15.

Bags BG1-BG3 in FIG. 7 will next be explained. The bag setup in level 2 gift box live streaming room GSR2 is the same as the level 1 room GSR1. A more expensive bag will yield a better chance of drawing a rare or legendary gift. The only difference with the level 2 room GSR2 is that bags 2 and 3 BG2 and BG3 are pricier than their level 1 room GSR1 counterparts. The level 2 room GSR2 has a bag 2 cost BG2c of 3000 coins and a bag 3 cost BS3c of 5000 coins. On the other hand, the level 1 room GSR1 in FIG. 3 has a bag 2 cost BG2c of 1500 coins and a bag 3 cost BG3c of 3000 coins. Consequently, the cost for acquiring all the gifts is increased. Even though the bag 2 cost BG2c and the bag 3 cost BG3c have increased, the probabilities for drawing the different rarities remain the same for the bags across levels. It is also possible to change the odds of drawing each gift between levels.

The bag 1 cost BG1c remains at 500 coins. The reason for this is to continue engaging low spenders rather than scaring them away with prohibitively high costs. The embodiment is not limited to just this. It is possible to keep all the bag costs the same or to also increase the bag 1 cost BG1c. Additionally, the streamer LV can determine whether to increase the price of the bags.

Figure 8:
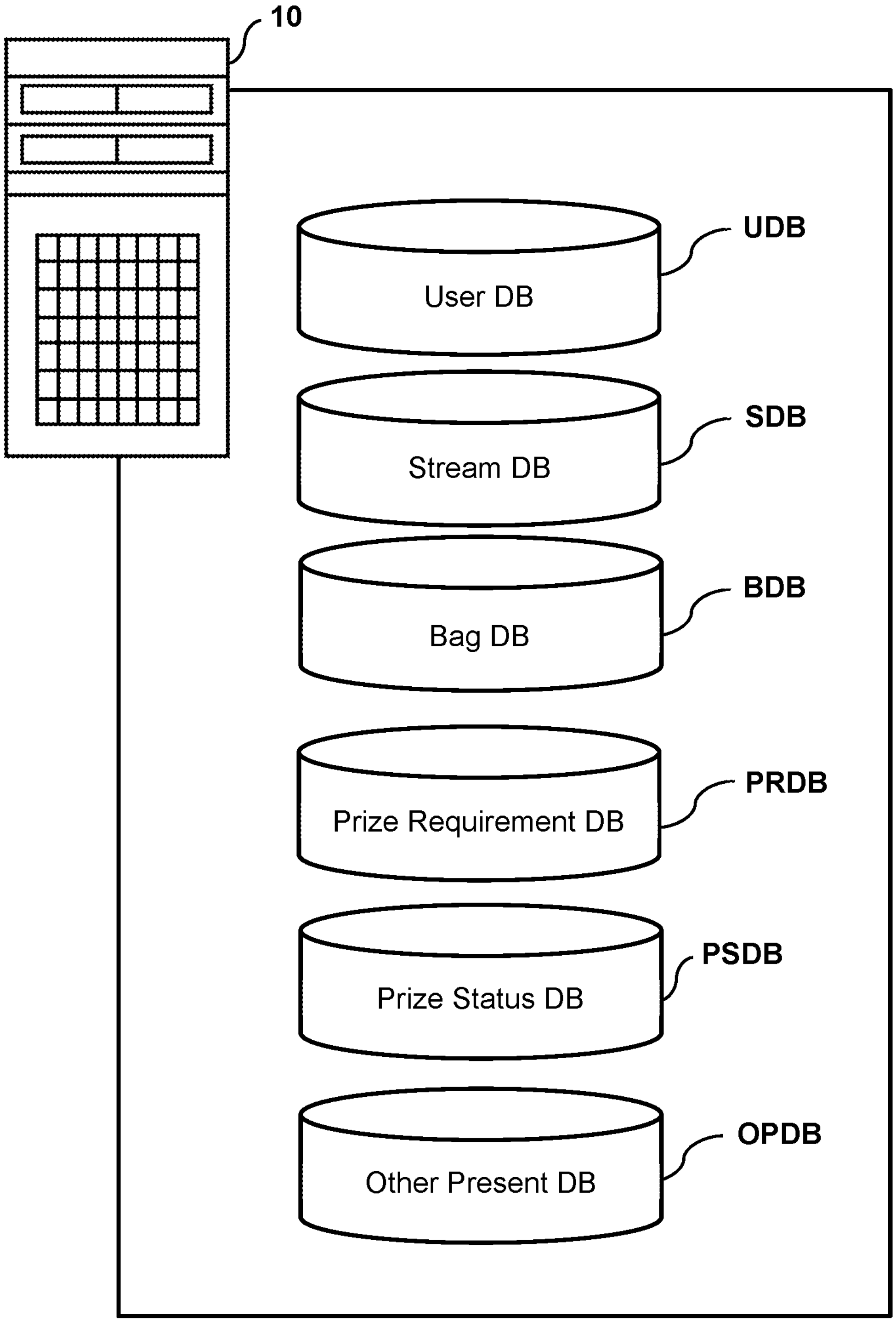
FIG. 8 is a block diagram of a server according to an embodiment of the disclosure.

FIG. 8 is a block diagram of the server 10 shown in FIG. 1. The server 10 comprises a plurality of databases including a user database UDB, a stream database SDB, a bag database BDB, a prize setting database PRDB, a prize status database PSDB, and an other present database OPDB. More details regarding these databases will be provided below.

All the elements shown in FIG. 8 can be implemented jointly by a computer and the like from a hardware perspective and by a computer program from a software perspective. Therefore, persons skilled in the art can understand that all the elements shown in FIG. 8 can be implemented in various ways by a combination of hardware and software.

The user database UDB stores information on registered users, including both the streamer LV and the viewers AU. Information about the users include user ID, coins, and loyalty points. When each user registers for an account, they are assigned a unique user ID. Further, the total number of coins they have amassed is included in the user database UDB. Coins are accrued through purchase using real-world currency or by exchanging loyalty points. Further, users receive loyalty points for using the app, viewing live streams, or participating in other activities. Finally, the number of loyalty points each user has collected is tallied. The streamer will receive loyalty points upon completion of a gift box level. Loyalty points can be exchanged for coins, but loyalty points cannot be used to purchase bags. Loyalty points are used to determine the amount of money a streamer receives from the administrator of the live-streaming platform. Table 1 below shows an example of the user database UDB.

TABLE 1

| User ID | Coins | Loyalty Points |
|---|---|---|
| STR01 | 200 | 50,000 |
| VW01 | 10,000 | 800 |
| VW05 | 5,000 | 200 |
| . . . | . . . | . . . |

Next, the stream database SDB stores information on ongoing live streams.

Information about the streams includes the stream ID, the streamer user ID, the viewer user IDs, the gift box event ID, and the remaining time. Each streaming room will have a unique stream ID. The streamer user ID and viewer user IDs correspond with the user IDs from the user database UDB (Table 1). The gift box event ID is given after the streamer LV selects the gift box icon IC shown in FIG. 2. Finally, the remaining time tracks the time remaining at the current level before the gift box event expires. Table 2 below shows an example of the stream database SDB. In this example, streamer "STR01" has selected the gift box icon IC and has a gift box event ID and remaining time; however, streamer "STR02" has not selected the gift box icon IC and does not have a gift box event ID nor a remaining time.

TABLE 2

| Stream ID | Streamer ID | Viewer IDs | Gift Box Event ID | Remaining Time |
|---|---|---|---|---|
| ABC0001 | STR01 | VW01, VW05, . . . | GBE01 | 1 d 3 h 2 m |
| DEF002 | STR02 | VW10, VW20, . . . | (N/A) | (N/A) |
| . . . | . . . | . . . | . . . | . . . |

The bag database BDB will now be described in detail. The bag database BDB stores all the information about each bag in its database. Each bag has a bag ID, a bag level, a bag price, and gift draw odds. The bag ID uniquely identifies each bag with a different code, the bag level is the level in which the bag can be purchased, the bag price is the cost in coins to purchase the bag, and the gift draw odds are the percentages for drawing each gift of the gift box for that level. Table 3 below shows an example of the bag database BDB.

TABLE 3

| Bag ID | Bag Level | Bag Price | Gift Draw Odds |
|---|---|---|---|
| BAG00 | Any | 0 | Legendary: 0.5%<br>Rare: 1%<br>Common: 98.5% |
| BAG01 | 1 | 500 | Cruise: 1%<br>Sports Car: 3%<br>Bell: 24%<br>Lighthouse: 24%<br>Heart Eyes: 24%<br>Hourglass: 24% |
| BAG02 | 1 | 1500 | Cruise: 5%<br>Sports Car: 15%<br>Bell: 20%<br>Lighthouse: 20%<br>Heart Eyes: 20%<br>Hourglass: 20% |
| BAG03 | 1 | 3000 | Cruise: 20%<br>Sports Car: 40%<br>Bell: 10%<br>Lighthouse: 10%<br>Heart Eyes: 10%<br>Hourglass: 10% |
| BAG04 | 2 | 500 | Building: 1%<br>Newspaper: 3%<br>Coffee: 24%<br>Dog: 24%<br>Rocket: 24%<br>Superhero: 24% |
| BAG05 | 2 | 3000 | Building: 5%<br>Newspaper: 15%<br>Coffee: 20%<br>Dog: 20%<br>Rocket: 20%<br>Superhero: 20% |
| BAG06 | 2 | 5000 | Building: 20%<br>Newspaper: 40%<br>Coffee: 10%<br>Dog: 10%<br>Rocket: 10%<br>Superhero: 10% |
| . . . | . . . | . . . | . . . |

The gift draw odds can be displayed by gift and/or by rarity. For example, Table 3 shows bag IDs "BAG01"–"BAG06" as displaying the gift draw odds for each gift for that level. However, bag ID "BAG00" displays the gift draw odds for each rarity across all levels. As a result, "BAG00" can be used for any level, while "BAG01"–"BAG06" can only be used for its assigned bag level.

A description of the prize requirement database PRDB will now be provided. The prize requirement database PRDB contains information about the completion criteria necessary to complete each level of the gift box event. Information about the gift box level LVL, the prize PZ, the completion criteria, the time duration of the level, and the usable bag IDs are included. For a certain gift box level LVL, the prize PZ is described along with the number of each gift that must be drawn for the streamer, the time duration to complete the level, and the bag IDs to be used for the level. Table 4 below shows an example of the prize requirement database PRDB.

TABLE 4

| Gift Box Level | Prize | Completion Criteria | Time Duration | Usable Bag IDs |
|---|---|---|---|---|
| 1 | Galaxy Explosion | Sports Car: 1<br>Bell: 1<br>Lighthouse: 1<br>Cruise: 1<br>Heart Eyes: 1<br>Hourglass: 1 | 2 days | BAG00<br>BAG01<br>BAG02<br>BAG03 |

TABLE 4-continued

| Gift Box Level | Prize | Completion Criteria | Time Duration | Usable Bag IDs |
|---|---|---|---|---|
| 2 | Koala Cuddle | Newspaper: 1<br>Coffee: 1<br>Dog: 1<br>Building: 1<br>Rocket: 1<br>Superhero: 1 | 1.5 days | BAG00<br>BAG04<br>BAG05<br>BAG06 |
| . . . | . . . | . . . | . . . | . . . |

While only one of each gift must be drawn to achieve the completion criteria in the embodiment above, the invention is not limited to this. Within the prize requirement database PRDB, the number of each gift that must be drawn for the streamer can be set to any number. For example, level 25 could require 3 of the same legendaries and 3 of the same rares as its completion criteria. Further, the time duration resets for every level. In Table 4 above, the streamer LV is given 2 days to complete level 1. If level 1 is completed within 2 days, then the timer is reset to 1.5 days to complete level 2. Alternatively, the box gift event only lasts for a predetermined amount of time for all levels, which begins when the streamer LV selects the icon IC. For example, the streamer LV has 4 days to complete as many levels as possible. Further alternatively, the duration starts at a predetermined time for all streamers. As a result, all box gift events end for all streamers at the same time.

A description of the prize status database PSDB will now be provided. The prize status database PSDB contains information regarding the gift box event ID, the streamer ID, the gift box level LVL, the current completion status, the remaining time, and the contributor IDs. The gift box event ID, the streamer ID, and the remaining time can each be found in stream database SDB (Table 2). The gift box level LVL corresponds to the current level of the streamer LV, which can be found in FIG. 3 or 7. The completion status displays the quantity of each gift that the viewers of the streamer have drawn in the current level. Last, the contributor IDs correspond to the user IDs of all the viewers AU who have contributed in the current level. Table 5 below shows an example of the prize status database PSDB.

TABLE 5

| Gift Box Event ID | Streamer ID | Gift Box Level | Completion Status | Remaining Time | Contributor IDs |
|---|---|---|---|---|---|
| GBE01 | STR01 | 1 | Sports Car: 1<br>Heart Eyes: 5 | 1 d 3 h<br>2 m | VW01,<br>VW05, . . . |
| GBE02 | STR03 | 2 | Coffee: 2<br>Dog: 1<br>Rocket: 1 | 21 h 30 m | VW10,<br>VW15, . . . |
| . . . | . . . | . . . | . . . | . . . | . . . |

In the example of Table 5, the first entry with the gift box event ID "GBE01" corresponds with the scenario of FIG. 3.

The other present database OPDB stores information about other presents that can be gifted to the streamer LV. Other presents are different from the gifts GF1-GF6 of a live streaming room GSR. These presents can be purchased for the streamer during a live stream or at any time other than during the gift box event. On the other hand, during the gift box event, only bags can be purchased for the streamer. The other presents can be given to show appreciation to the streamer. However, there is no collaborative effort or team goal for the other present mechanism. To summarize, viewers can send items to the streamer at any time; other presents can be given during a live stream, while gifts can be drawn for the streamer during the gift box event. In another embodiment, the viewer may be given a choice to purchase a bag for the gift box event or purchase a present for the streamer. The viewer can purchase the other present and also can purchase a bag in the same stream. In this embodiment, the presents are always available to use in a stream while the bags are available only when the streamer participates in the gift box event.

The other present database OPDB includes a present ID, a price, and a present description. Table 6 below shows an example of the other present database OPDB.

TABLE 6

| Present ID | Price | Present Description |
|---|---|---|
| PST01 | 200 | Apple |
| PST02 | 300 | Flower |
| . . . | . . . | . . . |

Figure 9A:
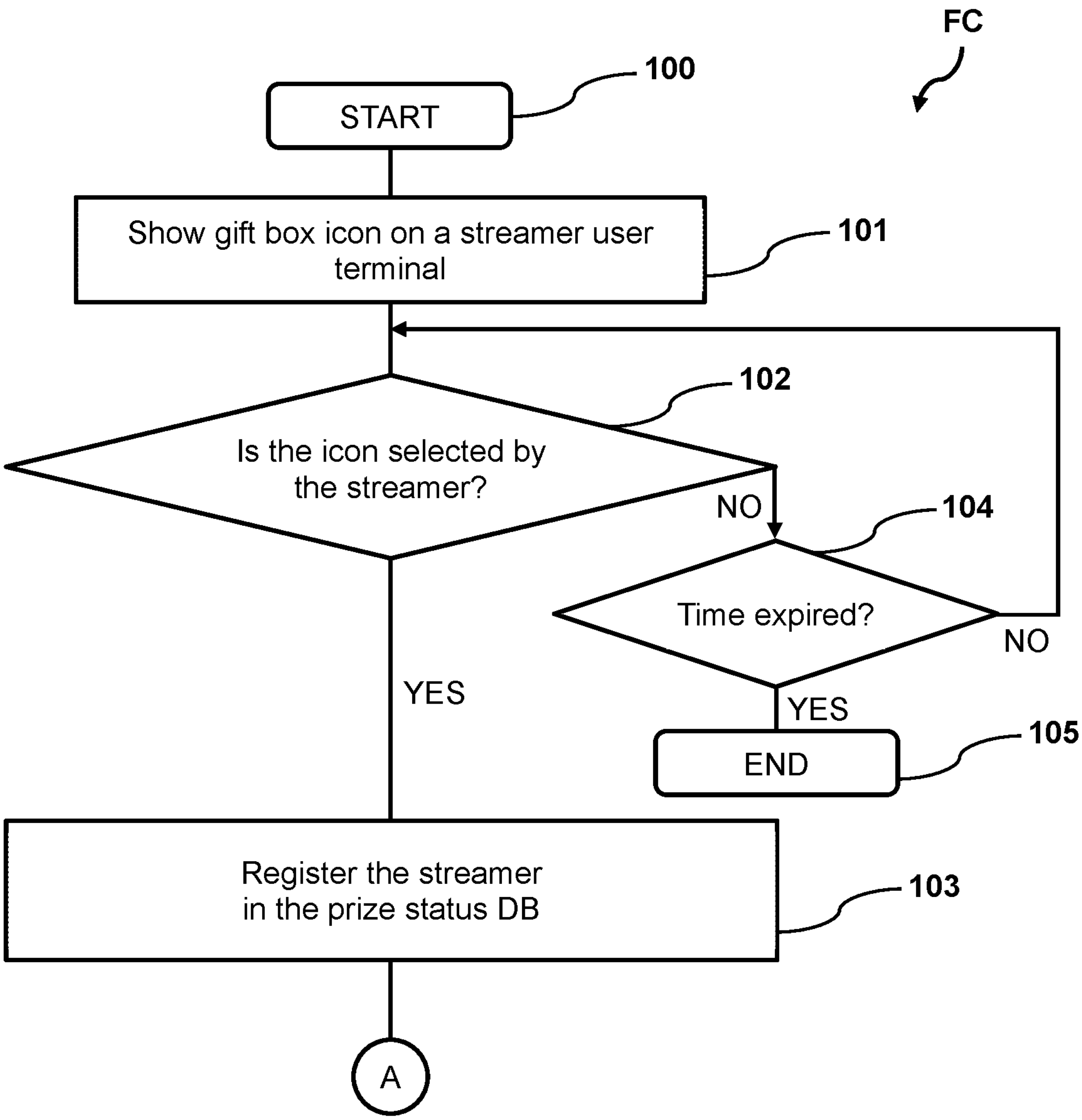
FIGS. 9A-9B is a flowchart of a method for viewers giving gifts to a streamer according to an embodiment of the disclosure.
Figure 9B:
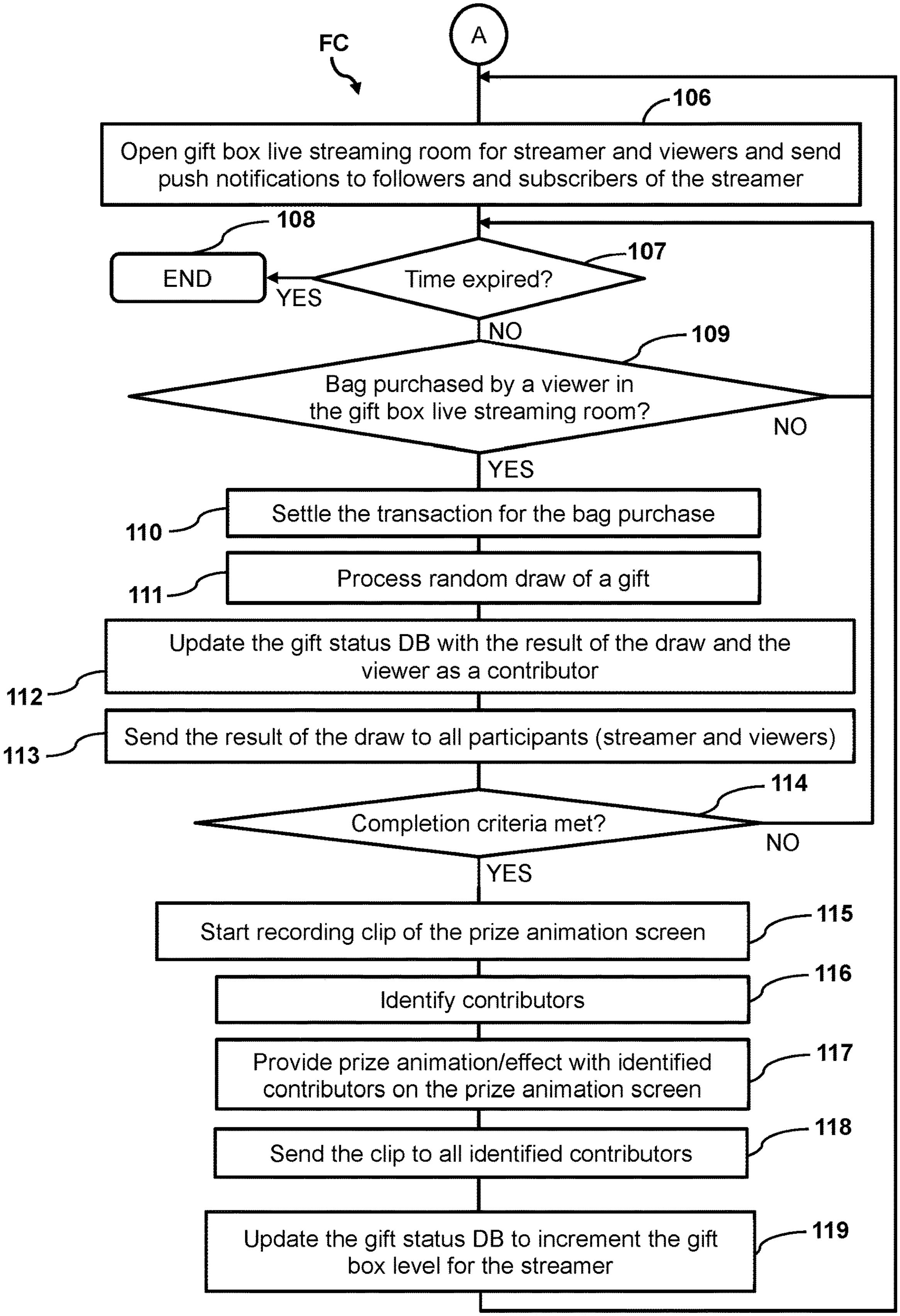

FIGS. 9A-9B is a flowchart FC of a method for viewers giving gifts to a streamer according to an embodiment of the disclosure. FIG. 9A shows that step 100 is the start of the flowchart FC. In step 101, the gift box icon IC is shown on the streamer user terminal 20 (see FIG. 2). At step 102, it is determined whether the icon has been selected by the streamer. If YES, then at the server 10, the streamer is registered in the prize status database PSDB (shown in FIG. 8) at step 103. If NO, then the chart moves to step 104, where, at the server 10, it checks if time has expired. In response to whether time has expired, if YES, then the chart moves to step 105, which is an endpoint of the chart. On the other hand, if NO, meaning that time has not expired, then the chart will loop back to step 102. After step 103, the chart proceeds to point A and is continued in FIG. 9B.

FIG. 9B shows the remainder of the flowchart FC starting at point A. At step 106, the server 10 opens the gift box live streaming room GSR1, GSR2 (shown in FIGS. 3 and 7, respectively) and permits the streamer LV and the viewers AU1, AU2, . . . (shown in FIG. 1) to enter the live streaming room. At step 106, the server 10 also sends push notifications to followers and subscribers of the streamer. The push notifications indicates that the streamer initiated the gift box event and that the followers and/or subscribers are encouraged to join the event for the streamer. The chart then proceeds to step 107. At step 107, the server 10 checks to see if the time associated with the current gift box event has expired. If YES, then the chart reaches another ending point at step 108. If NO, then the chart advances to step 109. At step 109 the server 10 checks to see if a bag BG1-BG3 (shown in FIG. 3) has been purchased by a viewer in the gift box live streaming room. If YES, then the chart advances to step 110, at which the server 10 settles the transaction for the bag purchase. However, if NO, then the chart loops back to step 107. After step 110, at step 111 the server 10 processes a random draw of a gift GF1-GF6 (shown in FIG. 3). Based on the bag purchased, a gift will be randomly drawn based on percentages stored in the bag database BDB (Table 3). Following step 111, at step 112 the server 10 updates the prize status database PSDB (Table 5) with the result of the draw and records the viewer as a contributor. Next, the chart proceeds to step 113. At step 113 the server 10 sends the result of the draw to all participants, which includes both the streamer and viewers.

After step 113 is completed, at step 114, the server 10 determines, by referring to the prize requirement database PRDB (Table 4) and the prize status database PSDB (Table 5), if the completion criteria is met. The completion criteria requirements have been set in the prize requirement database PRDB. If the streamer has acquired the number of gifts in prize status database PSDB as set forth in the prize requirement database PRDB, then the completion criteria is satisfied, and step 114 results in a YES, moving on to step 115. On the other hand, if all the gifts have not yet been drawn for the streamer, then step 114 results in a NO, and the chart loops back to step 107. At step 115, the server 10 starts recording a clip of the prize animation screen shown in FIG. 6. At step 116, the sever 10 then identifies a list of the prize contributors PZc by referring to the prize status database PSDB. Next, at step 117, the user terminal 20, 30 provides the prize animation or effect PZa while also displaying the prize contributors PZc on the prize animation screen shown in FIG. 6. Step 118 follows, via the server 10, by sending the clip recorded from step 115 to all the identified contributors. Upon completion of step 118, the chart proceeds to step 119. At step 119 the server 10 updates the prize status database PSDB (shown in FIG. 8) to increment the gift box level LVL (shown in FIG. 3) for the streamer. Following step 119, the chart returns to step 106 to start the next level gift box event.

It is noted that during the gift box event, a live stream of the streamer LV (seen in FIG. 1) can be shown on the screen at any time. The dynamic image VD1, VD2 can be shown in a corner of the screen and the location can be adjusted to another corner or enlarged by the viewer AU1, AU2 at the viewer user terminal 30*a*, 30*b* (seen in FIG. 1). For example, the dynamic image can appear at the top of the gift box live streaming rooms GSR1, GSR2 shown in FIGS. 3 and 7, respectively. As a result, the streamer LV can encourage the viewers AU to purchase bags and thank them for doing so.

Other variations of the disclosure will be described below. A leaderboard among streamers LV can be created to show their level LVL in the gift box event. The streamers will be ranked by their current level. The leaderboard can be viewed by streamers and viewers at any time. As a result, there can be friendly competition between the streamers to see who can advance furthest. Further, there can be a reward for the streamer in first place after a predetermined time. An example of the leaderboard is shown below in Table 7:

TABLE 7

| Rank | Streamer | Level |
|---|---|---|
| 1 | AAA | 5 |
| 2 | BBB | 4 |
| 3 | CCC | 4 |
| . . . | . . . | . . . |

Another variation is introducing a time limit for obtaining a gift. For example, if the time limit is 15 minutes, then a bag must be purchased within the 15 minutes; otherwise, the gift box event will end. Once one gift has been drawn, the timer will reset to 15 minutes and start counting down again. The time limit can replace the time remaining clock, or they can be used in conjunction. The time limit promotes consistent gift giving, while the time remaining clock ensures that all the gifts will be drawn within a certain amount of time.

Further, one of the gifts that can be drawn is a clock that increases the remaining time. The streamer does not need to be given a clock in order to complete the level, but the clock can be very useful by adding more time to complete the level. For example, the clock can add an additional hour or even an additional day to the remaining time counter. All clocks can add the same amount of time, or there can be different clocks with varying amounts of additional time. The clock can be used with the time limit feature above by increasing the time limit to draw a gift by, for example, another 15 minutes.

A variation to the gift images, shown as a sports car, a bell, a lighthouse, a cruise, a heart eyes, and an hourglass in level 1 shown in FIG. 3, is that they can instead be pieces of a puzzle. The six gifts are six different pieces that form a complete puzzle when pieced together. It is also possible for the picture of the puzzle to be the prize, which is the galaxy explosion in level 1, shown in FIG. 6. As a result, when all the puzzle pieces are collected, then the galaxy explosion prize can be seen. The pieces will still have varying types of rarity. However, it is not necessary to have exactly six puzzles pieces; more or less puzzle pieces can be used depending on the level.

While there are three rarities disclosed, those being common, rare, and legendary, the disclosure is not limited to three. There could be any number of rarities, from one up to ten. The difference between rarities is only the difficulty to acquire the gift. A gift of higher rarity will, on average, cost more to acquire than a gift of lower rarity.

A variation to the bag is that there may be a type of bag which draws a plurality of gifts. For example, an expensive type of bag may draw one legendary gift and one common gift for a total of two gifts.

A variation to making a bag purchase is that there may be a free bag. The free bag is available without any payment by a viewer. Instead, once the free bag is used in a gift box live stream by a viewer, the viewer needs to wait for a predetermined time or until the next level before the viewer can use the free bag again. The odds for the free bag are worse for higher rarities than the bags requiring payment. An example of the free bag is bag ID "BAG00" in Table 3.

In an embodiment, purchase of a bag by a viewer may or may not give the streamer of the stream in which the box gift event is conducted loyalty points. Purchase of an other present by a viewer should give the streamer loyalty points. The bag and the other present are similar in that both are purchased by a viewer in a live stream with coins. However, the bag and the other present still are different types of digital items because the bag contributes to filling up the box whereas the present does not.

A variation to the opening of the gift box live stream is that, instead of opening a new live stream for the gift box event, the gift box event can be started in the existing live stream of the streamer. The streamer selects the gift box icon and the respective gift box event starts in the live stream of the streamer in which the gift box icon is selected. This variation enables smooth and/or seamless transition from the normal live stream to the gift box event live stream.

Figure 10:
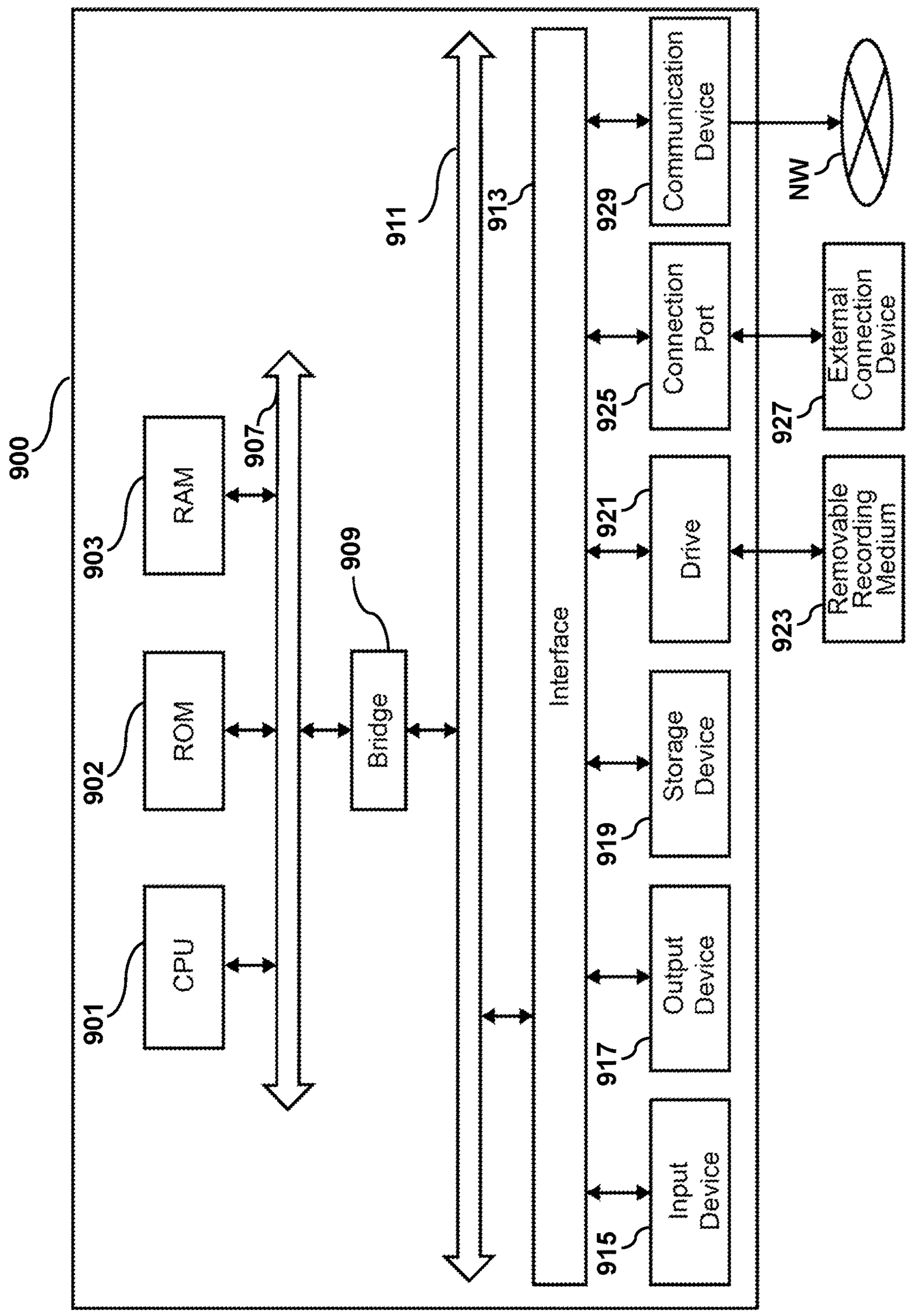
FIG. 10 is a block diagram of a hardware configuration of an information processing device according to an embodiment of the disclosure.

FIG. 10 is a block diagram of a hardware configuration of an information processing device 900 according to the embodiment of the disclosure. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown).

The CPU 901 functions as an arithmetic processing device and a control device, and controls all or some of the operations in the information processing device 900 according to various programs stored in the ROM 902, the RAM 903, the storage device 919, or the removable recording medium 923. For example, the CPU 901 controls the overall operation of each functional unit included in the server 10 and the user terminals 20 and 30 in the embodiment. In addition to or instead of the CPU 901, the information processing device 900 may also include a DSP (Digital Signal Processor) or ASIC (Application Specific Integrated Circuit). The ROM 902 stores programs, calculation parameters, and the like used by the CPU 901. The RAM 903 serves as a primary storage that stores a program used in the execution of the CPU 901, parameters that appropriately change in the execution, and the like. The CPU 901, ROM 902, and RAM 903 are interconnected to each other by a host bus 907 which may be an internal bus such as a CPU bus. Further, the host bus 907 is connected to an external bus 911 such as a PCI (Peripheral Component Interconnect/Interface) bus via a bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing unit 900 as text, video such as images, or sound such as audio.

The storage device 919 is a device for storing data configured as an example of a storage unit of the information processing equipment 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for a removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is an imaging element such as a CCD (Charge Coupled Device) or CMOS (Complementary Metal Oxide Semiconductor), and a device that captures an image of the real space using various elements such as lenses for controlling image formation of a subject on the imaging element to generate the captured image. The image capturing device may capture a still image or may capture a moving image.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

While specific embodiments of the invention have been described above, it will be appreciated that the invention may be practiced otherwise than as described. The description is not intended to limit the invention.

In the disclosure, the use of "gift box event" and "box gacha" are interchangeable. Although the disclosure primarily uses the term "gift box event," any use of the term "gift box event" can be substituted with "box gacha."

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments but should be defined only in accordance with the following claims and their equivalents.

What is claimed is:

1. A method of displaying a gift box live streaming room over a network to a streamer and to viewers connected to said network via a live stream, utilizing a server, the method comprising:

displaying a gift box level of the streamer to both a streamer user terminal of the streamer and viewer user terminals of the viewers connected to the network, said gift box level being stored in the server;

illustrating a plurality of gifts having a plurality of rarities to at least the viewers, the plurality of gifts being determined by the server;

illustrating a plurality of bags of different costs that can be purchased to at least the viewers via the network, wherein the viewers can purchase a bag from the plurality of bags that randomly draws a gift for the streamer based on the cost of the bag and the rarity of the gift and wherein the server is configured to record each drawn gift and each viewer of the live stream contributing to the plurality of gifts and transmit, over the network, to each viewer user terminal and the streamer user terminal results of the recorded drawn gifts and the viewers;

illustrating a prize for the streamer, wherein the streamer will receive the prize on the streamer user terminal if all of the gifts in the gift box level has been drawn for the streamer; and animating the prize and displaying a list of each viewer on the streamer user terminal and the viewer user terminals who purchased at least one of the bags for the streamer.

2. The method of claim 1, further comprising displaying a gift drawn number for each gift of the plurality of the gifts to show how many of each gift has already been drawn.

3. The method of claim 1, further comprising displaying a time remaining in the gift box level live streaming room to draw all the gifts of the plurality of gifts.

4. The method of claim 1, further comprising displaying the odds that each gift will be drawn when a bag of the plurality of bags is purchased.

5. The method of claim 1, further comprising displaying a prize value to be received by the streamer for achieving the prize.

6. The method of claim 1, further comprising recording and transmitting over the network a clip of the animating the prize and sending the clip to at least one of the viewers.

7. The method of claim 1, wherein the displaying a gift box level of the streamer includes displaying an incremented gift box level of the streamer after the streamer receives the prize.

8. A server, comprising:

a status storing unit configured to store a degree of achievement for a condition per streamer of a live stream running said live stream via a streamer user terminal over a network to at least one viewer connected to said network, the condition being achieved when the status storing unit determines the streamer obtains certain digital items;

a drawing unit configured to perform a draw process of digital items in response to receiving payment of price by each viewer via a viewer user terminal connected to the network, said payment received during real-time interaction of each viewer in the live stream running on the viewer user terminal which is remote from the streamer user terminal of the streamer and connected to said network;

an updating unit configured to update the status storing unit according to results of the draw process, said update including recording in the status storing unit each drawn digital item and each viewer of the live stream contributing to the streamer obtaining the certain digital items and transmitting, over the network, to each viewer user terminal of each viewer and the streamer user terminal of the streamer said results of the draw process and said update; and a setting unit configured to set, when the condition associated with the streamer is achieved by the update in the updating unit, a new condition for the streamer that is transmitted via the network in the live stream to the streamer user terminal of the streamer and each viewer user terminal of each user.

9. The server of claim 8, further comprising:

a provision unit configured to provide, when the condition associated with the streamer is achieved by the update in the updating unit, the streamer with rewards corresponding to the achieved condition.

10. The server of claim 9, wherein the new condition set by the setting unit is set to be harder to achieve than the original condition and wherein rewards provided when the new condition is achieved is set to be more than that provided when the original condition is achieved.

11. The server of claim 8, further comprising:

a unit configured to perform, when the condition associated with the streamer is achieved by the update in the updating unit, a process to associatively display an effect corresponding to the achieved condition and at least one viewer having contributed to the achievement of the condition on a terminal of the streamer and on a terminal of the viewer, said process including recording and transmitting an animation and the at least one viewer having contributed concurrently during said live stream to the streamer user terminal of the streamer and each viewer user terminal of each user, and sending over the network the displayed animation and content to at least each viewer user terminal of the at least one viewer having contributed.

12. The server of claim 8, wherein the drawing unit performs the draw process so that the higher the paid price is, the higher the rarity of the drawn digital item is.

13. The server of claim 8, wherein the drawing unit performs a draw process without requiring the payment of price by a viewer, and wherein the rarity of the drawn digital item with payment of price is set to be higher than the rarity of the drawn item without payment of price.

14. A method, including:

storing, in a status storing unit, a degree of achievement for a condition per streamer of a live stream running said live stream via a streamer user terminal over a network, the condition being achieved when the status storing unit determines the streamer obtains certain digital items;

performing a draw process, using a drawing unit, of digital items in response to receiving payment of price by a each viewer via a viewer user terminal connected to the network, said payment received during real-time interaction of each viewer in the live stream running on the viewer user terminal which is remote from the streamer user terminal of the streamer and connected to said network;

updating the status storing unit, using an updating unit, according to results of the draw process, said update including recording in the status storing unit each drawn digital item and each viewer of the live stream contributing to the streamer obtaining the certain digital items and transmitting, over the network, to each viewer user terminal of each viewer and the streamer user terminal of the streamer said results of the draw process; and setting, with a setting unit when the condition associated with the streamer is achieved by the update, a new condition for the streamer that is transmitted via the network in the live stream to the streamer user terminal of the streamer and each viewer user terminal of each user.

15. The method of claim 14, further including:

providing, when the condition associated with the streamer is achieved by the update, the streamer with rewards corresponding to the achieved condition.

16. The method of claim 15, wherein the new condition is set to be harder to achieve than the original condition and wherein rewards provided when the new condition is achieved is set to be more than that provided when the original condition is achieved.

17. The method of claim 14, further including:

performing with a unit, when the condition associated with the streamer is achieved by the update, a process to associatively display effect corresponding to the achieved condition and at least one viewer having contributed to the achievement of the condition on a terminal of the streamer and on a terminal of the viewer, said process including recording and transmitting an animation and the at least one viewer having contributed concurrently during said live stream to the streamer user terminal of the streamer and each viewer user terminal of each user, and sending over the network the displayed animation and content to at least each viewer user terminal of the at least one viewer having contributed.

18. The method of claim 14, wherein the performing includes performing the draw process so that the higher the paid price is, the higher the rarity of the drawn digital item is.

19. The method of claim 14, further including:

performing a draw process without requiring the payment of price by a viewer, wherein the rarity of the drawn digital item with payment of price is set to be higher than the rarity of the drawn item without payment of price.

* * * * *